(12) United States Patent
Baek et al.

(10) Patent No.: US 9,020,775 B2
(45) Date of Patent: Apr. 28, 2015

(54) APPARATUS FOR MEASURING THE SHAPE AND AREA OF A SHIP BLOCK

(75) Inventors: Tae Hyun Baek, Ulsan (KR); Ji Hwang Jang, Ulsan (KR); Ji On Kim, Ulsan (KR); Moon Young Chung, Ulsan (KR); Byeong Yeol Lee, Ulsan (KR); Sang Gyu Min, Ulsan (KR)

(73) Assignee: Hyundai Industries Co., Ltd., Ulsan (KR)

( * ) Notice: Subject to any disclaimer, the term of this patent is extended or adjusted under 35 U.S.C. 154(b) by 459 days.

(21) Appl. No.: 13/391,970

(22) PCT Filed: Aug. 25, 2010

(86) PCT No.: PCT/KR2010/005697
§ 371 (c)(1),
(2), (4) Date: Feb. 23, 2012

(87) PCT Pub. No.: WO2011/025258
PCT Pub. Date: Mar. 3, 2011

(65) Prior Publication Data
US 2012/0150486 A1    Jun. 14, 2012

(51) Int. Cl.
*G01C 9/00* (2006.01)
*G01C 1/00* (2006.01)
(Continued)

(52) U.S. Cl.
CPC .............. *G01B 11/285* (2013.01); *B63B 9/00* (2013.01); *G01B 11/24* (2013.01); *G01C 15/002* (2013.01)

(58) Field of Classification Search
CPC ........ B63B 9/00; G01B 11/24; G01B 11/285; G01C 15/002
USPC .............. 702/151, 127, 150, 152, 155–156, 702/158–159, 167, 172, 189; 33/1 AP, 1 PT, 33/1 T, 21.1, 26, 27.01, 281–282, 33/284–285, 700–701; 340/568.1, 572.1; 703/1; 356/2–3, 11, 138, 601, 614, 356/620, 625, 628

See application file for complete search history.

(56) References Cited

U.S. PATENT DOCUMENTS

| | | | |
|---|---|---|---|
| 6,330,523 B1 | 12/2001 | Kacyra et al. | 702/159 |
| 8,653,945 B2 * | 2/2014 | Baek et al. | 340/10.1 |

FOREIGN PATENT DOCUMENTS

| | | |
|---|---|---|
| EP | 1906139 A | 4/2008 |
| KR | 10-2007-0013705 | 1/2007 |

(Continued)

OTHER PUBLICATIONS

Shimizu, H., Evaluation of Three Dimensional Coordinate Measuring Methods for Production of Ship Hull Blocks, May 26-31, 2002, Proceedings of the Twelth (2002) International Offshore and Polar Engineering Conference, Kitakyushu, Japan, pp. 348-351.*

(Continued)

*Primary Examiner* — Toan Le
(74) *Attorney, Agent, or Firm* — Ohlandt Greeley Ruggiero & Perle LLP

(57) ABSTRACT

Provided is an apparatus for measuring a shape and area of a ship block, which may accurately recognize a piling location of a ship block by measuring a shape and area of the ship block piled up in a yard. The apparatus for measuring a shape and area of a ship block includes a direction angle sensor, a range finder, a radio frequency identification (RFID) reader and a block shape and area measuring system. The block shape and area measuring system includes a block shape and area measuring server, a vector calculating module, a coordinate calculating module, a shape and area extraction module and a memory module.

1 Claim, 4 Drawing Sheets

(51) Int. Cl.
*G01B 11/28* (2006.01)
*G01B 11/24* (2006.01)
*G01C 15/00* (2006.01)
*B63B 9/00* (2006.01)

(56) References Cited

FOREIGN PATENT DOCUMENTS

| KR | 100876424 | 12/2008 |
|---|---|---|
| WO | WO 98/11405 | 3/1998 |

OTHER PUBLICATIONS

Chinese Office Action dated Jan. 28, 2014 corresponding to Chinese Application No. 201080038328.2; 7 pages.

Xin Li et al., "On Ship Shape Surveying Using 3-D Laser Scanning Technique" Journal of Geomatics, vol. 31, No. 6, pp. 36-37, Dec. 2006.

International Search Report dated Jun. 3, 2011 in counterpart International Application No. PCT/KR2010/005697.

* cited by examiner

APPARATUS FOR MEASURING THE SHAPE AND AREA OF A SHIP BLOCK

BACKGROUND OF THE DISCLOSURE

1. Technical Field

The present disclosure relates to an apparatus for measuring a shape and area of a ship block, and more particularly, to an apparatus for measuring a shape and area of a ship block, which measures a shape and area of a ship block piled up in a yard so that a piling location of a ship block may be accurately recognized.

2. Background Art

In a general shipbuilding flow, a ship is built in the order of a designing process, a cutting and processing process, an assembling process, an outfitting process, a painting process, and an erecting process. In addition, since a ship has a large area, the cutting and processing process is generally performed in a block unit in consideration of workload, working conditions, working time or the like. The block means a unit area by which the ship is divided into a certain area.

Such blocks are carried in or out according to each process in a state of being piled up in a predetermined yard. And a carrying means, called a transporter, is used for carrying in or out the blocks. Meanwhile, the blocks of a ship have various shapes and areas according to the ship location, and accordingly, the shape and area of a block should be considered for efficient operation of the yard and easy carrying of the block.

In an existing case, blocks are piled up in a yard and carried in or out without consideration of shape and area of the blocks, which results in deteriorated operating efficiency of the yard and bad carrying efficiency of the transporter which carries in or out the blocks.

Technical Problem

The present disclosure is directed to providing an apparatus for measuring a shape and area of a ship block, which measures a shape and area of a ship block piled up in a yard so that a piling location of a ship block may be accurately recognized.

Technical Solution

In one general aspect, the present disclosure provides an apparatus for measuring a shape and area of a ship block, comprising a direction angle sensor, a range finder, an RFID reader and a block shape and area measuring system, wherein the block shape and area measuring system includes a block shape and area measuring server, a vector calculating module, a coordinate calculating module, a shape and area extraction module and a memory module, wherein the direction angle sensor plays a role of measuring a direction angle of each edge of a block present at a specific location in the yard, the range finder plays a role of measuring a distance between a reference point and each edge of the block, and the RFID reader plays a role of recognizing locations of tags disposed at regular intervals in the yard where the block is piled up, wherein the memory module plays a role of storing direction angle information of each edge of the block, measured by the direction angle sensor, and distance information between the reference point and each edge of the block, measured by the range finder, the vector calculating module plays a role of calculating a vector value of the corresponding edge of the block by using the direction angle information and the distance information of the specific edge of the block, the coordinate calculating module plays a role of calculating a coordinate of the specific edge of the block by using the location information of the tag and the vector value calculated by the vector calculating module, and the shape and area extraction module plays a role of calculating distances of coordinates in a state where coordinates are set for all edges of the block by the coordinate calculating module, thereby extracting a planar shape and area of the block of a polygonal shape.

The reference point may be one of a plurality tags disposed in the yard.

Advantageous Effects

The apparatus for measuring a shape and area of a ship block according to the present disclosure gives the following effects.

Shapes and areas of blocks piled up in a yard may be accurately measured through a direction angle sensor, a range finder, an RFID system or the like, and therefore the blocks may be carried in or out more efficiently.

DESCRIPTION OF DRAWINGS

The above and other objects, features and advantages of the present disclosure will become apparent from the following description of certain exemplary embodiments given in conjunction with the accompanying drawings, in which.

DETAILED DESCRIPTION OF THE DISCLOSURE

Figure 1:
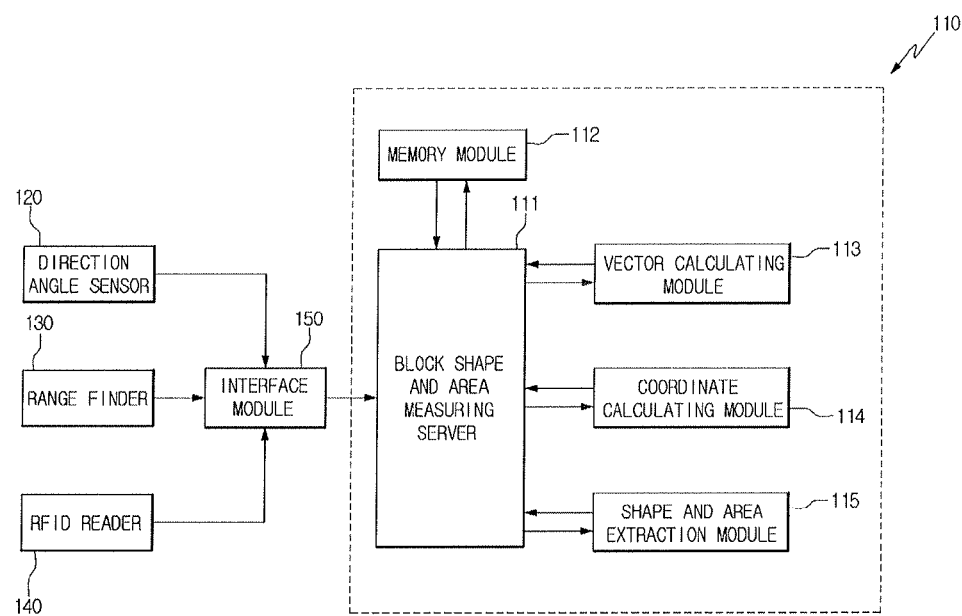
FIG. 1 is a block diagram showing an apparatus for measuring a shape and area of a ship block according to an embodiment of the present disclosure.

Hereinafter, an apparatus for measuring a shape and area of a ship block according to an embodiment of the present disclosure will be described in detail with reference to accompanying drawings. FIG. 1 is a block diagram showing an apparatus for measuring a shape and area of a ship block according to an embodiment of the present disclosure.

As shown in FIG. 1, the apparatus for measuring a shape and area of a ship block according to an embodiment of the present disclosure generally includes a direction angle sensor 120, a range finder 130, a radio frequency identification (RFID) reader 140 and a block shape and area measuring system 110.

The direction angle sensor 120 plays a role of measuring a direction angle of each edge of a block present at a specific location in the yard, and transmitting the measured direction angle information to the block shape and area measuring system 110. At this time, the direction angle of each edge of the block is measured based on a reference angle, and the reference angle is applied identically to every edge of all blocks. The reference angle may be arbitrarily set by a user, or for example, a magnetic north direction at a reference point may be set as the reference angle.

The range finder 130 plays a role of measuring a distance between the reference point and each edge of the block, and transmitting the measured distance information to the block shape and area measuring system 110. In one embodiment, a laser range finder 130 may be used, and a distance between the reference point and the block edge may be measured through the time in which laser is irradiated to each edge of the block from the reference point and reflected thereto.

The RFID reader 140 plays a role of recognizing tags disposed at regular intervals in the yard, and transmitting the corresponding tag information to the block shape and area measuring system 110. The tags disposed in the yard correspond to coordinates on a plane, and the reference point may also be one of the pluralities of tags.

The block shape and area measuring system 110 includes a block shape and area measuring server 111, a vector calculating module 113, a coordinate calculating module 114, a shape and area extraction module 115 and a memory module 112. The memory module 112 plays a role of storing information measured by the direction angle sensor 120, the range finder 130 and the RFID reader 140. In detail, the memory module 112 stores direction angle information of each edge of the block, measured by the direction angle sensor 120, distance information between the reference point and each edge of the block, measured by the range finder 130, and location information of the tags disposed in the yard. At this time, the information measured by the direction angle sensor 120, the range finder 130 and the RFID reader 140 is received by the block shape and area measuring system 110 by means of an interface module 150, and the corresponding received information is stored in the memory module 112 under the control of the block shape and area measuring server 111.

Meanwhile, since blocks have various shapes, all edges of a block may not be observed at a specific location. In this case, the location where each edge of the block is measured may be changed. In other words, the direction angle and distance of all edges may not be measured at a single reference point, but they may be measured at a plurality of reference points. In this case, the direction angle information and the distance information need to be calibrated. For example, if the direction angle information and distance information of all edges of a block are measured at three reference points, one reference point is set as a main reference point among three reference points, and angle and distance of each of the other two reference points in comparison to the main reference point should be reflected on the direction angle information and distance information measured for the other two reference points, and the calibrated direction angle information and distance information are stored in the memory module 112.

The vector calculating module 113 calculates a vector value of each edge of the block based on the direction angle information and the distance information, and plays a role of calculating a vector value of the corresponding block edge by using the direction angle information of a specific edge of a block and the distance information of the corresponding edge (the distance between the reference point and the edge).

The coordinate calculating module 114 plays a role of calculating a coordinate of a specific block edge by using the location information of the tag and the vector value calculated by the vector calculating module 113. Coordinates of all edges of the block may be set through the coordinate calculating module 114.

The shape and area extraction module 115 extracts a planar shape and area of a specific block in the yard. Specifically, in a state where the coordinates of all edges of a block are set by the coordinate calculating module 114, the shape and area extraction module 115 plays a role of calculating distances between the coordinates, namely distances between adjacent two coordinates, to extract a planar shape and area of the block of a polygonal shape.

Finally, the block shape and area measuring server 111 plays a role of receiving the information input from the direction angle sensor 120, the range finder 130, and the RFID reader 140 and storing the received information in the memory module 112, and plays a role of generally controlling a vector calculating process, a coordinate calculating process and a shape and area extracting process in linkage with the vector calculating module 113, the coordinate calculating module 114, the shape and area extraction module 115 and the memory module 112.

Figure 2:
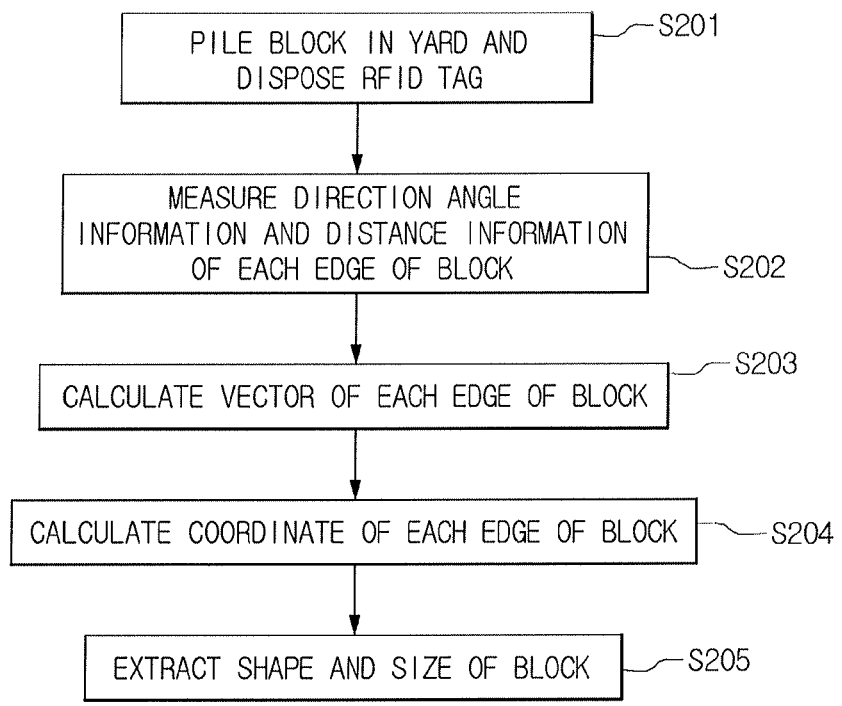
FIG. 2 is a flowchart for illustrating operations of the apparatus for measuring a shape and area of a ship block according to an embodiment of the present disclosure.
Figure 3A:
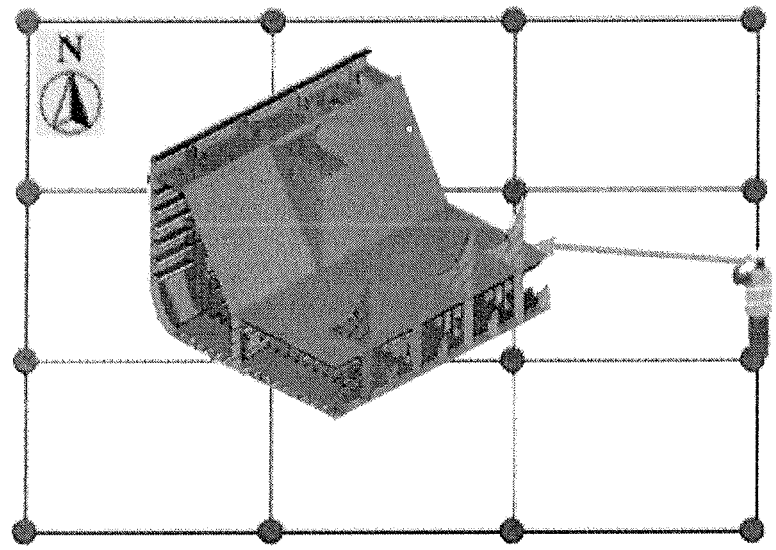
FIGS. 3a to 3d are reference views for illustrating operations of the apparatus for measuring a shape and area of a ship block according to an embodiment of the present disclosure.
Figure 3B:
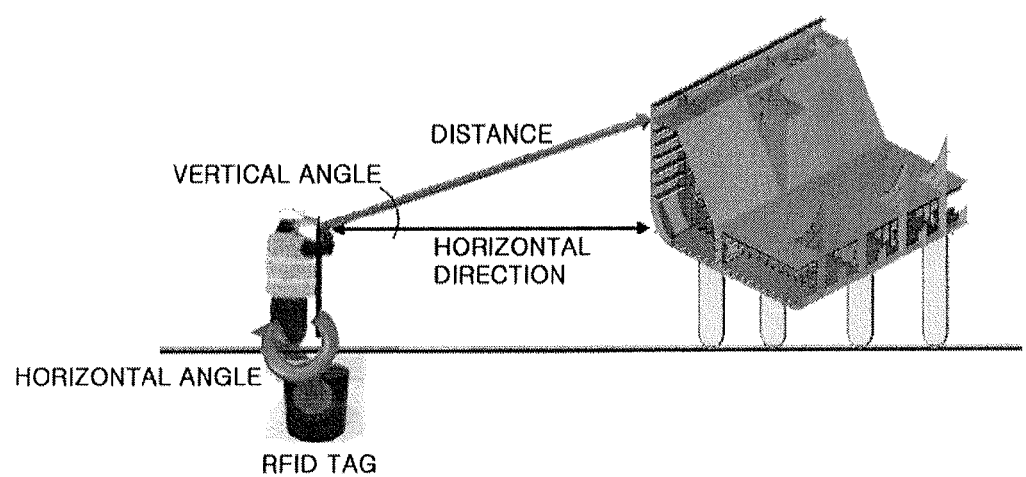
Figure 3C:
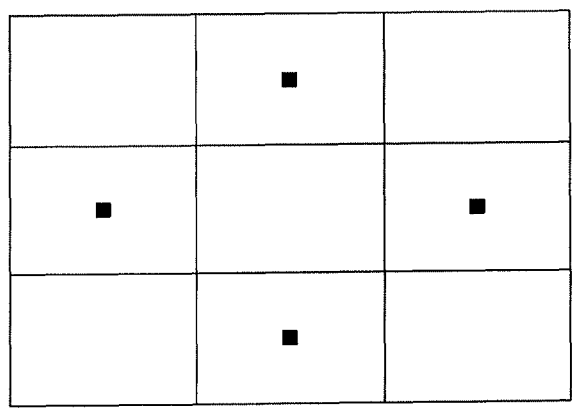
Figure 3D:
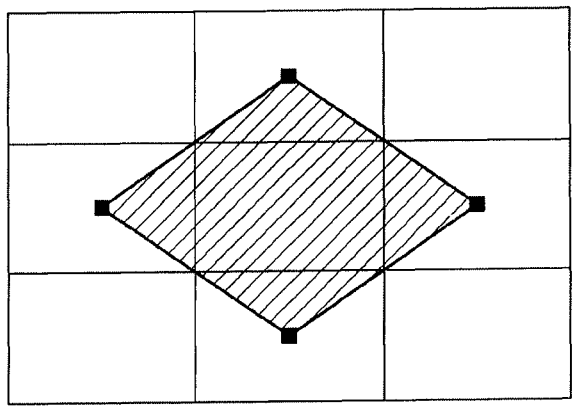

Heretofore, the configuration of the apparatus for measuring a shape and area of a ship block according to the embodiment of the present disclosure is described. Hereinafter, operations of the apparatus for measuring a shape and area of a ship block according to the embodiment of the present disclosure will be described. FIG. 2 is a flowchart for illustrating operations of the apparatus for measuring a shape and area of a ship block according to the embodiment of the present disclosure, and FIGS. 3a to 3d are reference views for illustrating operations of the apparatus for measuring a shape and area of a ship block according to the embodiment of the present disclosure.

First, as shown in FIG. 2, blocks are filed up in a yard (S201). At this time, RFID tags are disposed at regular intervals in the yard, and each of the RFID tags corresponds to the location information in the yard. The location of the RFID tag is recognized by the RFID reader 140, and the location information of the corresponding tags is stored in advance in the memory module 112 of the block shape and area measuring system 110.

In this state, the process of measuring direction angle information and distance information of each edge of a block is performed (S202). The direction angle information is obtained through the direction angle sensor 120. In detail, based on a specific reference direction (reference angle), an angle of a block edge to be measured, namely a direction angle, is measured through the direction angle sensor 120. Next, the distance information is obtained by measuring a distance between the specific reference point and the block edge to be measured by using the range finder 130, for example the laser range finder 130 (see FIGS. 3a and 3b).

At this time, all edges of the block may not be measured at a single reference point due to a large area of the block. In this case, the reference point may be changed for each block edge to be measured. In the case where edges of a block are measured using a plurality of reference points, one of the plurality of reference points is set as a main reference point, and angles and distances between the other reference points and the main reference point should be reflected on the direction angle information measured for the other reference points for compensation.

The direction angle information and the distance information for each edge of the block, measured by the direction angle sensor 120 and the range finder 130 are stored in the memory module 112 of the block shape and area measuring system 110 through the interface module 150, and in this state, the vector calculating process, the coordinate calculating process and the shape and area extracting process are performed.

First, in the vector calculating process, the vector calculating module 113 calculates a vector value of the corresponding block edge by using the direction angle information of a specific edge of the block and the distance information (the distance between the reference point and the edge) of the specific edge, stored in the memory module 112, under the control of the block shape and area measuring server 111 (S203). In the state where the vector value is calculated, the coordinate calculating process is performed. In other words, the coordinate calculating module 114 calculates a coordinate of the specific edge of the block by using the location information of the tag and the vector value calculated by the vector calculating module 113 (S204). In this way, the coordinates of all edges of the block may be set (see FIG. 3c).

In the state where the vector values and coordinates are set for all edges of the blocks, a shape and area extracting process is performed (S205). In detail, in the state where the coordinates are set for all edges of the block by the coordinate calculating module 114, the shape and area extraction module 115 calculates distances between coordinates, namely distances between every two adjacent coordinates in order to extract a planar shape and area of a polygonal block (see FIG. 3d).

Industrial Applicability

A shape and area of a block piled up in a yard may be accurately measured through the direction angle sensor, the range finder, the RFID system or the like, and the efficiency of carrying in or out the block may be improved accordingly.

The invention claimed is:

1. An apparatus for measuring a shape and area of a ship block, comprising a direction angle sensor, a range finder, a radio frequency identification (RFID) reader and a block shape and area measuring system, wherein the block shape and area measuring system includes a block shape and area measuring server, a vector calculating module, a coordinate calculating module, a shape and area extraction module and a memory module, wherein the direction angle sensor plays a role of measuring a direction angle of each edge of a block present at a specific location in the yard, the range finder plays a role of measuring a distance between a reference point and each edge of the block, and the RFID reader plays a role of recognizing locations of tags disposed at regular intervals in the yard where the block is piled up, wherein the memory module plays a role of storing direction angle information of each edge of the block, measured by the direction angle sensor, and distance information between the reference point and each edge of the block, measured by the range finder, the vector calculating module plays a role of calculating a vector value of the corresponding edge of the block by using the direction angle information and the distance information of the specific edge of the block, the coordinate calculating module plays a role of calculating a coordinate of the specific edge of the block by using the location information of the tag and the vector value calculated by the vector calculating module, and the shape and area extraction module plays a role of calculating distances of coordinates in a state where coordinates are set for all edges of the block by the coordinate calculating module, thereby extracting a planar shape and area of the block of a polygonal shape, and wherein the tags disposed at regular intervals in the yard correspond to coordinates on a plane and the reference point is one of a plurality tags disposed in the yard.

* * * * *